United States Patent [19]

Justice

[11] 3,745,242

[45] July 10, 1973

[54] MULTIPLEX TV SYSTEM FOR TRANSMITTING AND RECEIVING A PLURALITY OF PICTURES ON A LINE SHARING BASIS

[75] Inventor: James W. H. Justice, Murrysville, Pa.

[73] Assignee: Westinghouse Electric Corportion, Pittsburgh, Pa.

[22] Filed: May 17, 1971

[21] Appl. No.: 143,775

[52] U.S. Cl. ................ 178/6, 178/5.6, 178/DIG. 23
[51] Int. Cl. ................ H04n 7/08
[58] Field of Search ........... 178/5.6, 5.8 R, DIG. 23, 178/DIG. 56, DIG. 3, 6, 6.8; 179/15 A, 2 TV

[56] References Cited

UNITED STATES PATENTS

| | | | |
|---|---|---|---|
| 3,686,436 | 8/1972 | Camras | 178/DIG. 23 |
| 3,488,435 | 1/1970 | Eilenberger | 178/5.6 |
| 2,696,523 | 12/1954 | Theile | 178/6.5 |
| 3,562,421 | 2/1971 | Moskovitz | 178/DIG. 23 |
| 3,358,079 | 12/1967 | Banning | 178/6.5 |

*Primary Examiner*—Robert L. Richardson
*Attorney*—F. H. Henson, C. F. Renz and A. Samuel Oddi

[57] ABSTRACT

System of transmitting and receiving a plurality of n-separate video pictures wherein every nth line of each of the pictures is selected for transmission beginning at a different line and wherein reception of a selected one of the pictures is accomplished by selecting from the plurality of lines transmitted every nth line commencing at the preselected line, with the selected line being delayed and then recombined with the underlayed selected line so that the selected one of the pictures may be displayed with high quality resolution.

8 Claims, 14 Drawing Figures

MULTIPLEX TV SYSTEM FOR TRANSMITTING AND RECEIVING A PLURALITY OF PICTURES ON A LINE SHARING BASIS

BACKGROUND OF THE INVENTION

1. Field of the Invention

The present invention relates to transmission and reception of a plurality of video pictures and, more particularly, to the transmission and reception of video pictures of high quality on a line sharing basis.

2. Description of the Prior Art

In copending application Ser. No. 135,713 (W.E. 40,682), filed Apr. 20, 1971, and assigned to the same assignee as the present application, a system is disclosed wherein a plurality of separate television pictures may be transmitted over a single television channel on a line sharing basis. A selected one of the plurality of pictures may be displayed on a receiver by selecting the lines corresponding to the desired picture. If, for example, two separate pictures are tramsmitted, the odd lines of each field would be selected for the first picture and the even lines of each field would be selected for the second picture for transmission. At the receiver if the first picture were desired to be displayed, the odd transmitted lines would be selected for display. Alternatively, if the second picture were desired the even lines out of the plurality of transmitted lines would be selected. Thus a complete frame (constituting two fields) of the first or second picture would comprise the odd or even lines of two fields interlaced according to standard television practice. Because only every other line of the picture for display is selected, the resolution of the received picture is halved as compared to the resolution of the originally scanned picture. Hence a relatively "liney" picture is reproduced at the receiver which may be undesirable for viewing in various applications. Another problem associated with line sharing systems is the difficulty of reproducing non-vertical edges (i.e. diagonals). Upon reproduction these edges appear serrated rather than continuous and also give the effect of picture "crawling" which may be anoying to the viewer. It thus would be highly desirable if the resolution of the picture selected for display and the capability of reproducing non-vertical edges could be improved while still providing a high quality picture otherwise without greatly increasing the expense and complexity of the receiver.

SUMMARY OF THE INVENTION

Broadly, the present invention provides a system wherein a plurality of pictures are transmitted on a line sharing basis and the plurality of pictures may be selected from the plurality transmitted, delayed and combined with the undelayed selected lines to provide a high quality representation of the selected picture.

DESCRIPTION OF THE PREFERRED EMBODIMENTS

Figure 1:
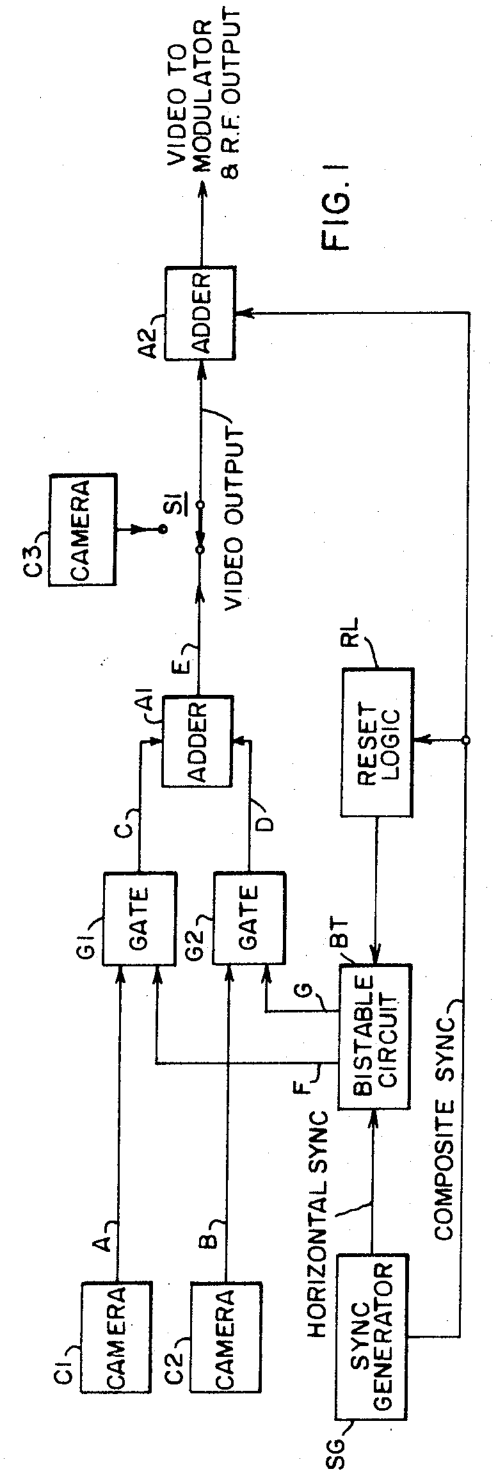
FIG. 1 is a block diagram of the transmitting apparatus of the present invention.
Figure 2:
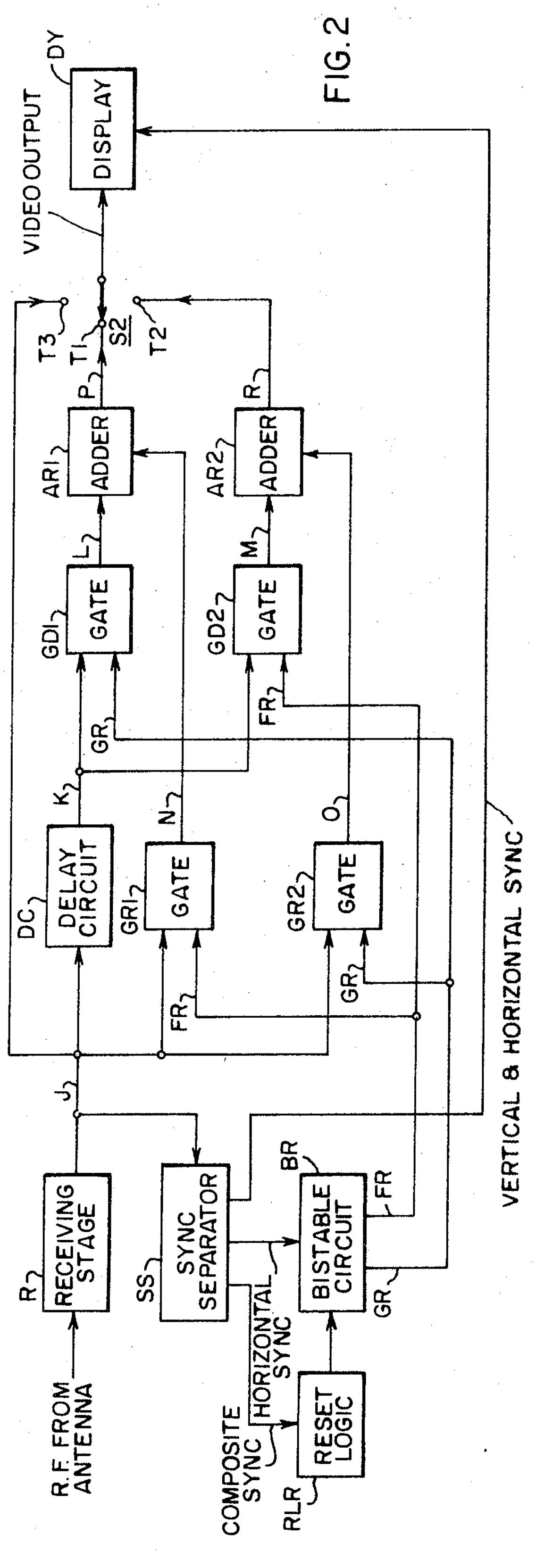
FIG. 2 is a block diagram of the receiving apparatus of the present invention.

FIG. 1 shows a transmitter according to the line sharing principle as disclosed in the copending application indicated above. FIG. 2 shows a receiver according to the principles of the present invention. In FIG. 1, a first camera C1 and a second camera C2 are employed respectively scanning a separate scene. The cameras C1 and C2 may comprise state-of-the-art monochrome or color television cameras which operate according to U.S. standards wherein two fields are interlaced to provide a complete frame of video information. A complete frame comprises 525 horizontal lines of two interlaced fields.

Figure 3:
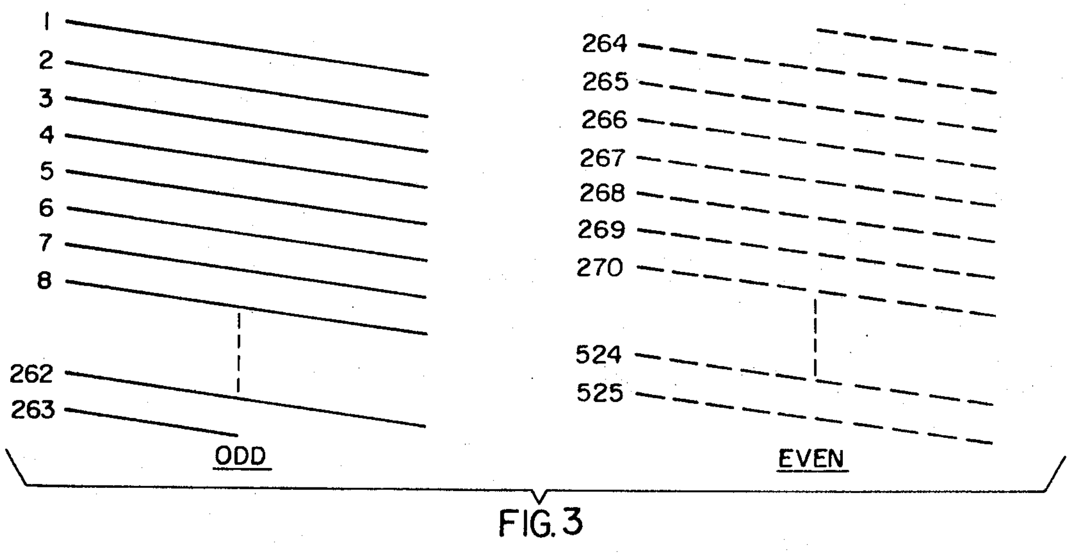
FIG. 3 is a pictorial diagram used in explaining the operation of the present invention.

As illustrated schematically in FIG. 3, field No. 1 comprises the lines 1 through 262 and a portion of line 263. The second field comprises the final portion of line 263 and then lines 264 through 525.

Both cameras C1 and C2 scan their respective scenes line by line through the two fields to comprise a complete interlaced frame upon reproduction. The video output A of the camera C1 is shown in curve A of FIG. 4 and is illustrated on a line by line basis during the first six lines of field No. 1. The output B of the camera C2 is illustrated in curve B of FIG. 4. The outputs A and B of the camera C1 and C2 are respectively applied to gates G1 and G2. The gates G1 and G2 respectively have gating signals F and G applied thereto supplied by a bistable circuit BT. A sync generator SG supplies horizontal sync pulses to the bistable circuit B, which causes the bistable circuit B alternately to provide outputs F and G as shown respectively on curves F and G of FIG. 4 during alternate lines. The composite sync output of the synchronizing generator SG is applied to a reset logic circuit RL which in response thereto provides a reset output to the bistable circuit B at the beginning of each frame of video information. That is, the bistable circuit B is reset after two fields of scan are completed which would contain 525 lines.

The gate G1 is rendered conductive by the input F thereto during the odd lines of each of the fields, that is, during the lines 1, 3, 5 – 525 so that these lines from output A of camera C1 are translated therethrough. The gate G2 is rendered conductive by the input G from the bistable circuit BT during the time intervals when the even lines of each of the fields are supplied to the gate from the camera C2. Thus lines 2, 4, 6–524 will be translated by the gate G2 from the output B of the camera C2. The output C of the gate G1 is shown in curve C of FIG. 4, and the output D of the gate G2 is shown in curve D of FIG. 4.

The odd lines of the output A of the camera C1 are supplied to an adder A1 while the even lines of the video output B are supplied thereto. The output of adder AD is the sum signal E which is equal to C+D. This is applied via the switch S1 to an output adder A2 wherein the composite sync signal from the synce generator SG is combined with the video output E. The composite video output of the adder A2 is then applied to a modulator to modulate a carrier for the RF transmission of the video information on the carrier by well known techniques. If desired, of course, cable transmission could be employed. The transmission would be upon a single channel and would be at full bandwidth with alternate lines of the outputs A and B of the cameras C1 and C2 respectively being transmitted in that order such as shown in curve E in FIG. 4.

A third camera C3 is provided and through the switch S1 may be connected to the adder A2 while disconnecting the cameras C1 and C2 therefrom. The camera C3 would transmit in a normal line by line fashion according to standard practice.

Figure 5:
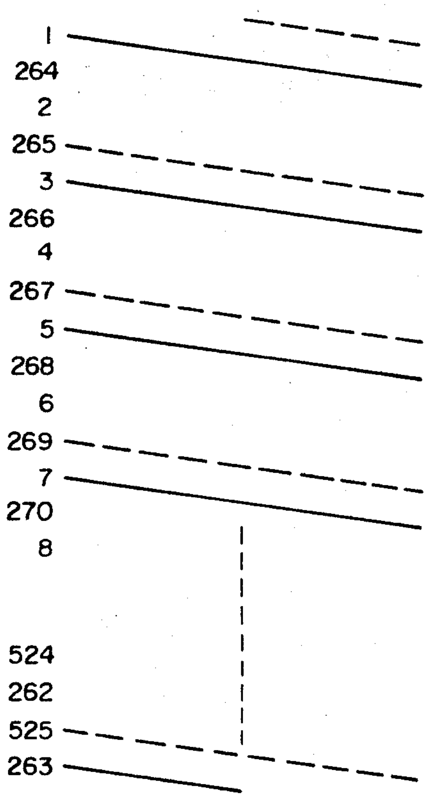
FIGS. 5 and 6 are pictorial diagrams used in explaining the operation of the present invention.

The transmitter video information includes alternate lines from the pictures scanned by the cameras C1 and C2. Either picture could thus be reconstructed by selecting at the receiver the odd lines from the composite received input for the first picture or the even lines for the second picture. FIG. 5 shows schematically the type of display that would be provided if each of the odd lines corresponding to the first picture were selected at a receiver for display for one complete frame of scan. As can be seen by FIG. 5 a picture of relatively poor line resolution is provided since only one half of the normal 525 lines in a frame will be displayed. Additionally an uneven line pairing will occur with two adjacent lines being then followed by a gap of two lines before the next two adjacent lines occur.

The receiver of the present invention as shown in FIG. 2 and the method of operation thereof overcomes the relatively poor resolution as would be provided in FIG. 5 and eliminates the uneven spacing of lines to provide full resolution at 525 lines per frame.

Figure 4:
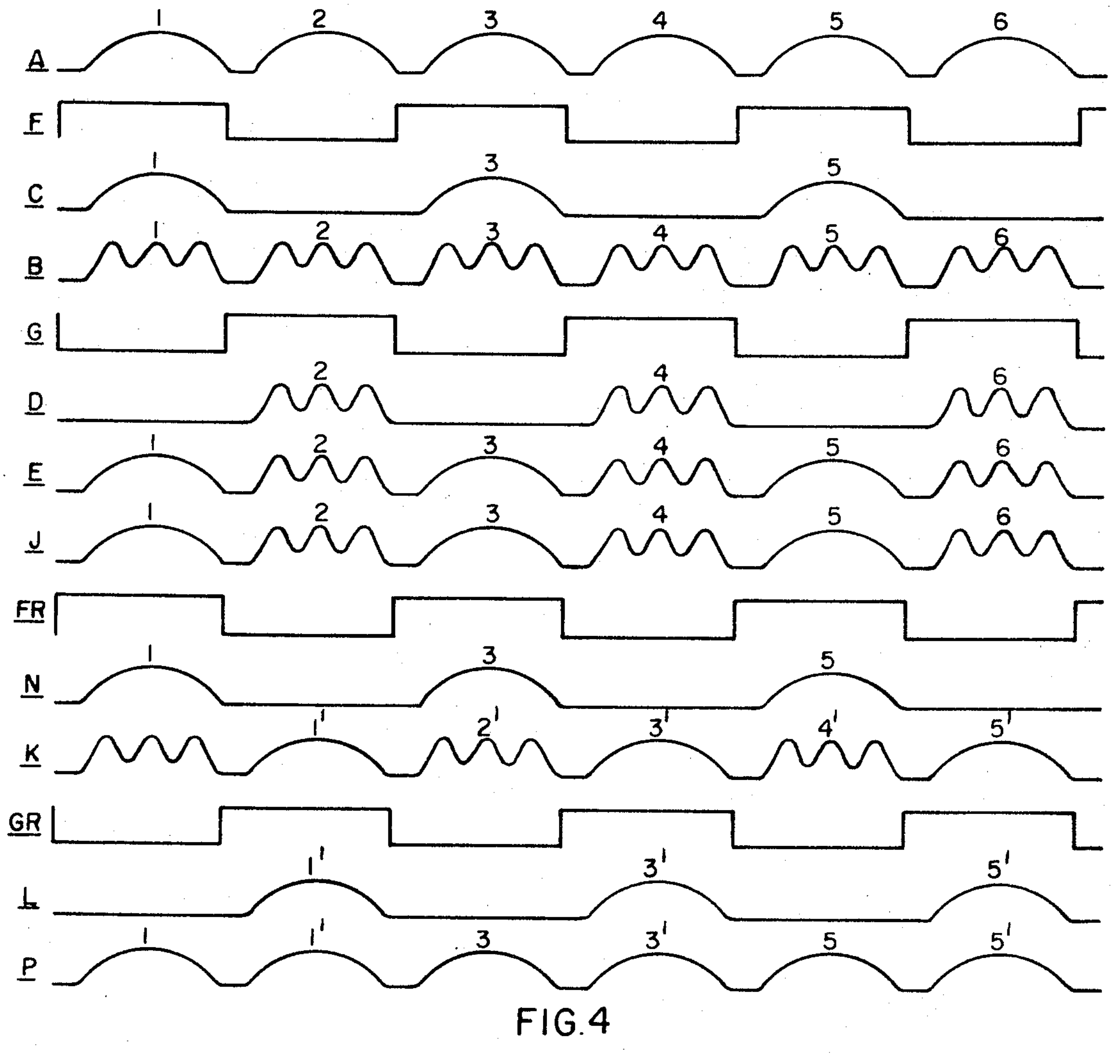
FIG. 4 is a waveform diagram including a plurality of curves employed in the explanation of the present invention.

Referring to FIG. 2 the transmitted video signals from the transmitter of FIG. 1 are received in a receiving stage R of the receiver including radio frequency, intermediate frequency and detecting circuits as well known in the art, so that the output J thereof comprises a video signal such as shown in curve J of FIG. 4 which corresponds to curve E of FIG. 4 at the transmitter. For simplicity of representation the waveform of curve J does not include the synchronizing information that would also be outputted from the stage R. The synchronizing information in the output of the receiving stage R is applied to a sync separator SS which provides a composite sync output at one output thereof and horizontal sync pulses at the other output thereof to a bistable circuit BR. The bistable BR is operative to alternately provide outputs FR and GR as shown in curves FR and GR of FIG. 4 at the line rate. A reset logic circuit RLL has applied thereto the composite sync output of the sync separator SS and provides a reset output at the frame rate that is, one-half the field rate to reset the bistable circuit BR at the beginning of each frame.

The video output J (including the odd lines from the first picture and the even lines from the second picture) is applied to a delay circuit DC, a gate GR1 and a gate GR2. The gate GR1 has applied thereto the gating pulses FR and the gate GR2 has applied thereto the gating pulses GR. Thus, the gate GR1 is rendered conductive during the times that the odd lines appear in the video signal J and supplies an output N consisting of the odd lines as illustrated in curve N of FIG. 4. The gate GR2 is responsive to the pulses GR and is rendered conductive during the presence of the even lines to supply an output O consisting of the even lines.

The delay circuit DC is selected to have a delay time equal to approximately one horizontal line of scan, that is, approximately 63.5 microseconds at a horizontal scanning rate of 15,750 Hz, for example. The delay circuit DC is selected to have a sufficient bandwidth to permit the transmission of the video signals J thereto in a manner suitable for reproduction but with a delay of one line period from its original real time position. The delay circuit DC may employ a glass or quartz delay line, or may employ the delay system as disclosed in copending application Ser. No. 155,078 filed (W.E. 41,284) and assigned to the same assignee as the present application.

The output K of the delay circuit DC thus corresponds to the video input J thereto, however, delayed by one horizontal line. The output K is shown in curve K of FIG. 4 with the prime designations (1', 2', 3'–) being indicative of the fact that the numbered line has been delayed by one line time. Accordingly, the delayed line 1' as shown in curve K will appear at a time one horizontal line period later than the line 1 as it appears in waveform N of FIG. 4.

The delayed waveform K is applied to a pair of gates GD1 and GD2. The gate GD1 has applied thereto the switching waveform GR which causes this gate to be rendered conductive during the time that the odd delayed lines appear at the input thereto so that the output L as shown in curve L of FIG. 4 includes the odd delayed lines 1', 3', 5'. The output L is applied to an adder AR1 to be added to the output N of the gate GR1 which comprises the undelayed odd lines 1, 3, 5. The composite output P of the adder AR1 is thus N+L which is illustrated in curve P of FIG. 4. The waveform P includes the undelayed line 1 followed by the delayed line 1', the undelayed line 3 followed by the delayed line 3', the undelayed line 5 followed by the delayed line 5', etc. The delayed lines 1', 3', 5' are substantially identical to their undelayed line counterparts.

The composite output P of the adder AR1 is applied to a switch S2 which includes three fixed terminal positions T1, T2 and T3. As shown in FIG. 2, the switch S2 is connected to the T1 terminal position. Thus the output P is applied to a display DY, which may comprise a standard cathode ray tube monitor. The vertical and horizontal synchronizing output of the sync separator SS would be applied to the display DY to control the scanning operation thereof.

The gate GD2 has the waveform FR applied thereto so that the gate GD2 is rendered conductive during the times that the delayed even lines of the waveform K are present so that the output of the gate GD2 is a waveform M which includes only the even delayed lines 2', 4', 6'. The output M is applied to an adder AR2 which also receives the output O of the gate GR2. The composite output of the adder AR2 is an output R which constitutes an undelayed even line followed by a delayed line, e.g., 2, 2', 4, 4', 6, 6'– The output R is applied to the terminal T2 of the switch S2 so that by switching the switch S2 to the T2 position the even undelayed and delayed lines may be applied to the display D.

Figure 6:
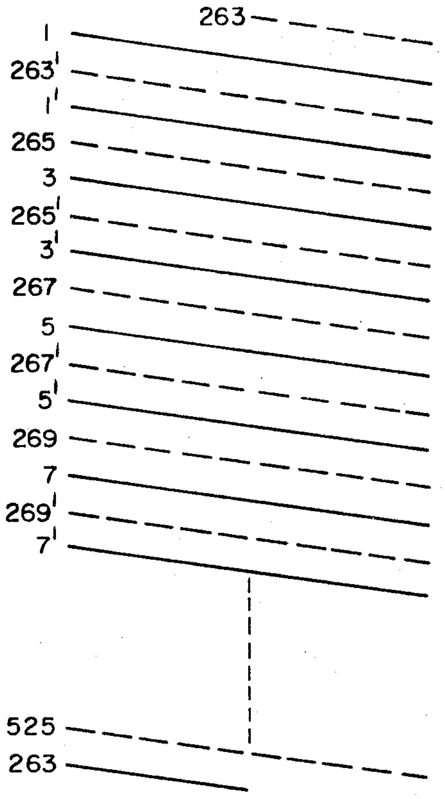

FIG. 6 shows a representation of the display which would be provided by the display D with the switch S2 in its T1 position so that the waveform P would be applied thereto for display. A complete frame including two fields of scan is illustrated in FIG. 6. Field 1 is shown in solid lines and field 2 is shown in dashed lines. During field 1, the scan is commenced with line 1 followed by delayed line 1′, then undelayed line 3, delayed line 3′– through the first part of undelayed line 263. The second field of scan thus commences with the remainder of line 263 with the delayed line 263′ following and being interlaced between the lines 1 and 1′. The scan then proceeds with the odd lines of the second field each followed by the delayed corresponding line. The first picture scanned by camera C1 is thus displayed at full line resolution with a 525 line frame with the lines being interlaced in the frame as would occur in a standard television format.

If it were desired to display the second picture output B of the camera C2 the switch S2 would be switched to the T2 terminal. This would permit the B picture information to be displayed as included in the even lines as selected for transmission by the transmitter of FIG. 1. Thus a complete frame of 525 lines comprising the even lines followed by the same even delayed line being displayed in substantially the identical manner as shown in FIG. 6.

If the camera C3 were being used for transmission through the transmitter of FIG. 1, the switch S2 would be connected to the terminal T3 which would then provide the display in response to the output of the camera C3 as would be the case in normal television transmission. In a television system employed for teaching purposes the output of camera C3 could be employed for explanatory purposes or for normal programming as desired.

The respective outputs A and B of the cameras C1 and C2 are separate and could be directed to the same subject matter at different intelligence levels, to different subject matter or to any teaching programming which adapts itself to television usage. At the receiver students in the same location or different locations within the broadcast range of the transmitter of FIG. 1 could receive either the A or B program as desired. It should also be understood that only two cameras C1 and C2 employed on a line sharing basis have been shown for the purposes of simplicity. Three or more camera setups could be employed such as the three picture system as shown in the copending application cited supra. If more than two pictures are transmited on a line sharing basis the delay introduced at the receiver required would be equal to $n-1$, where $n$ is the number of pictures, e.g. if 3 pictures were transmitted, the required delay would be 2 line periods.

The system of FIG. 1 and FIG. 2 also eliminates the problem of picture "crawling" particularly associated with non-vertical edges (diagonals) by synchronizing the transmitter and receiver to reset each frame. If each frame is considered separately as consisting of 525 lines starting with line 1, and alternate lines are selected, the first picture would appear on the odd lines of frame 1, the even lines of frame 2, the odd lines of frame 3 and the even lines of frame 4, etc. This would have the tendency of making the lines of the picture appear to "craw", i.e. appear to move upward or downward. This problem is averted in the transmitter of FIG. 1 and receiver of FIG. 2 by resetting after each frame (two fields), so that the first picture is always transmitted on the odd lines of each frame and the second picture on the even.

Another problem associated with the reproduction of a non-vertical edge in a line sharing system is that of producing a serrated edge upon reproduction rather than the diagonal due to the loss of the picture information by selecting only every other line from a field rather than each line.

Figure 7A:
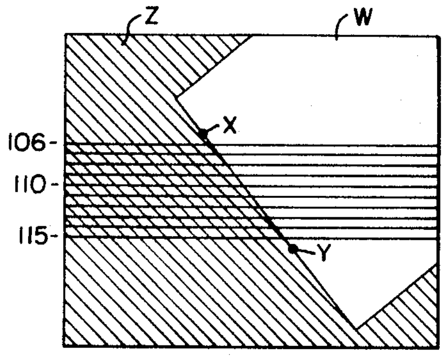
FIGS. 7A and 7B are diagrams used in the explanation of the operation of the transmitting system of FIG. 8.
Figure 7B:
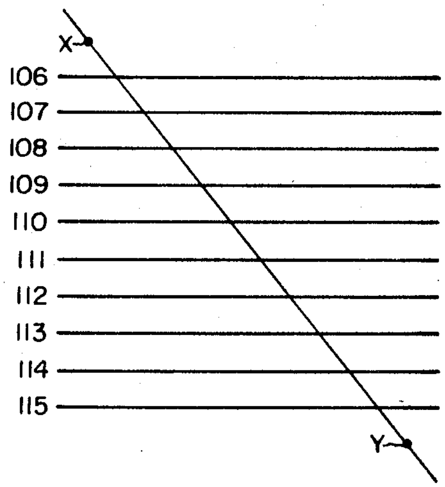

FIGS. 7A and 7B illustrate diagrammatically the type of non-vertical edge which tends to create serrated edges upon reproduction. FIG. 7A is an illustration of a video picture having a diagonal line XY therein with a black area Z (shown hatched) generally to the left of the diagonal XY and a white area W to the right thereof. Lines 106 through 115 are selected out of the total frame of lines for consideration. In FIG. 7B, the lines 106 through 115 are expanded to better show the diagonal line XY dividing black information to the left from white information on the right.

Figure 8A:
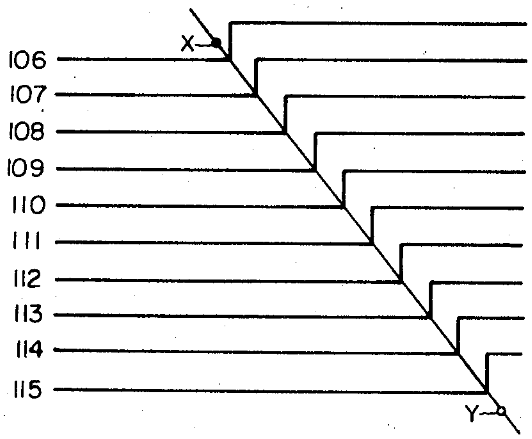
FIGS. 8A, 8B and 8C are line waveform diagrams used in the explanation of the operation of the transmitting system of FIG. 8 and the receiver of FIG. 2.
Figure 8B:
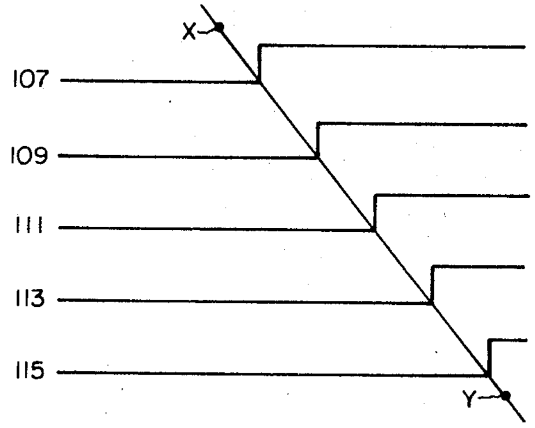

FIG. 8A shows the video output on a line by line basis of the diagonal change from white to black for the lines 106 through 115 which would be the video output A of camera C1 of FIG. 1 for example. With regard to the video output A of camera C1 in the line sharing transmission system as described with reference to FIG. 1 only the odd lines are selected for transmission. Thus as shown in FIG. 7B lines 107, 109, 111, 113 and 115 would be transmitted. As shown in FIG. 8B, if the transition from black to white along the diagonal XY were to be displayed for only the odd lines, the diagonal line XY would have a far greater tendency to appear serrated as compared to that of FIG. 7A where both odd and even lines were included in the picture.

Figure 8C:
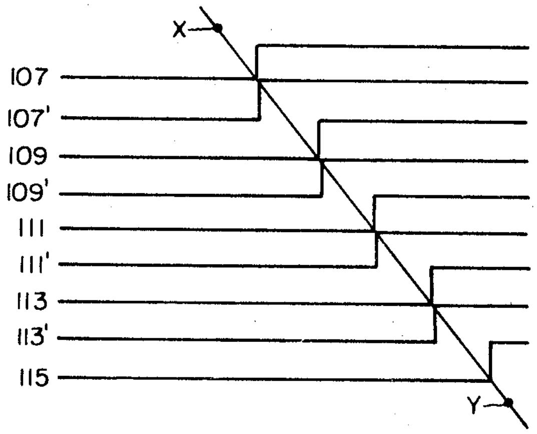

FIG. 8C shows the video waveforms for the line 107, the delayed line 107′, the line 109, delayed line 109′,– which would appear as the output P in FIG. 2, to be applied via the switch S2 to the display DY. By the delaying the odd numbered line by one line period, the line space between the adjacent undelayed line is filled to improve the resolution of the picture as explained above. However, in that the odd line is delayed by the line period, the step transition from black information to white information will occur at the same time for the undelayed and delayed odd numbered lines. The displayed picture would thus be as in FIG. 8C with the step change from black to white causing the diagonal XY to be displayed as serrated as opposed to a straight diagonal edge as originally scanned. This serrated effect for non-vertical information can be reduced by modifying the transmitter to avoid the sudden transition of black to white for a delayed and undelayed line at the same instant of time which results in a serrated appearance for the picture upon reproduction.

Figure 9:
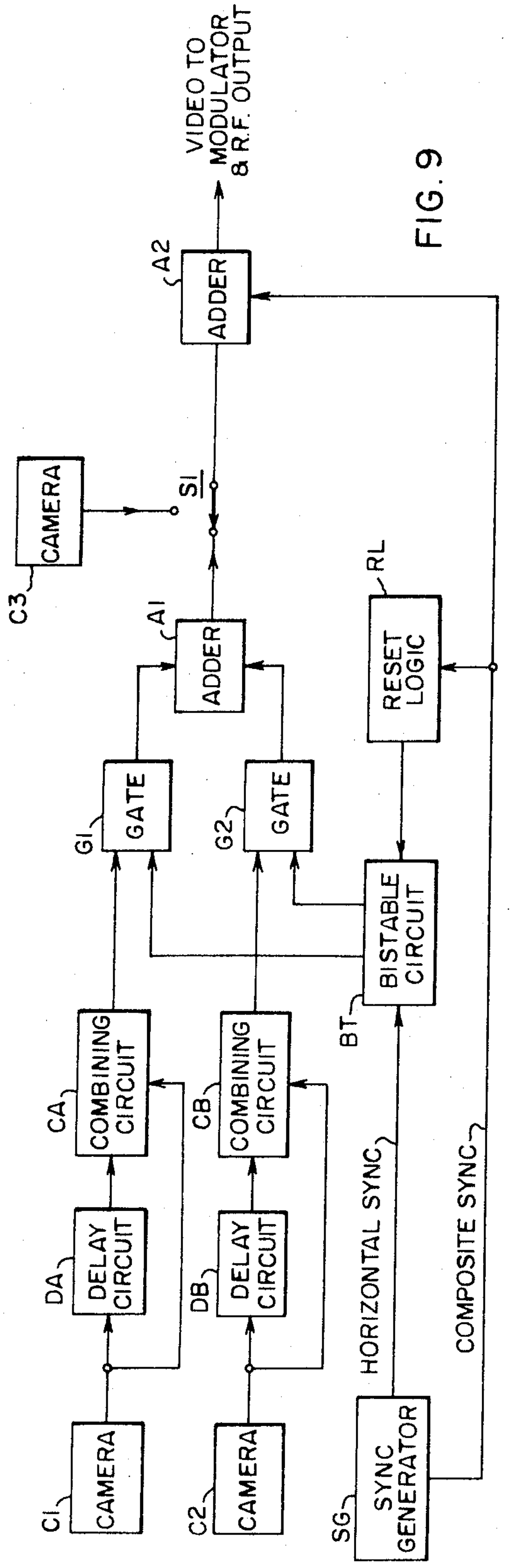
FIG. 9 is a block diagram of a transmitting system providing improved non-vertical edge reproduction.

In FIG. 9, the transmitter of FIG. 1 is modified in order to permit better diagonal line reproduction. FIG. 9 is identical to FIG. 1 except that a delay circuit DA and a combining circuit CA are connected in tandem between the camera C1 and the gate G1 and a delay circuit DB and a combining circuit CB are connected in tandem between the camera C2 and the gate G2. The delay circuits are selected to have a time delay of substantially one horizontal line period. The effect of the use of the delay circuit and combining circuit between the camera output and the respective gate is to provide each line in an undelayed manner to the gate together with the previous line which had been delayed by one complete horizontal line period.

Figure 10B:
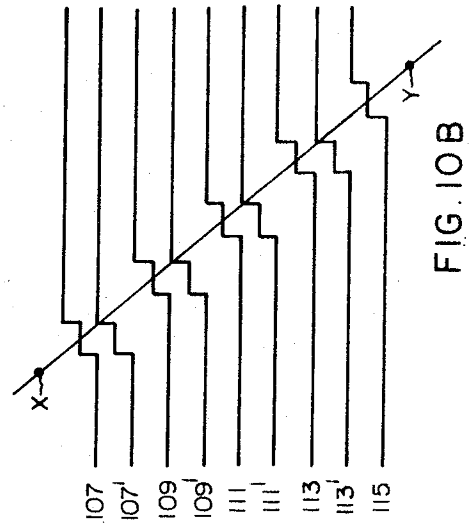
FIGS. 10A and 10B are line waveform diagrams used in explaining the operation of the present invention.
Figure 10A:
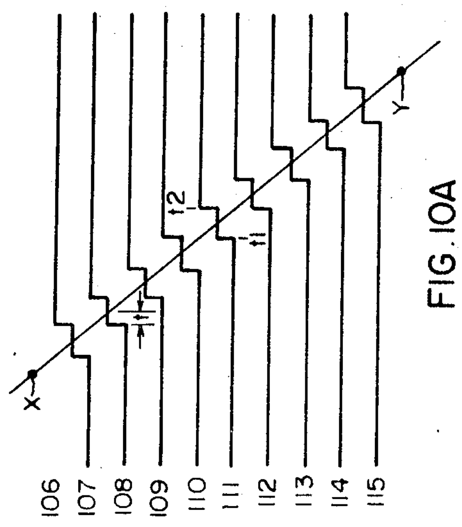

The type of video line waveform that will be provided in FIG. 9 to the gate G1 is shown in FIG. 10A for the same type of originally scanned picture information as shown in FIG. 7A. Thus, taking line 107 as exemplary, the video waveform would comprise the undelayed line 107 added to the line 106 delayed by one horizontal line period. Thus the stepped wave shape results at the diagonal XY as shown in FIG. 10A. In FIG. 9, the employment of the delay circuit DA and the combining circuit CA and delay circuit DB and the combining circuit CB thus permits a more gradual transition from black to white on diagonals thus tending to eliminate the serrated effect produced by the sudden step function of the black to full white at the intersection of the diagonal on the scanned picture. The use of a delay of one line period does not affect reproduction of vertical edges since the change occurs at the same time in each line.

FIG. 10B shows the line waveforms for the output P in the receiver of FIG. 2 employing the transmitter of FIG. 8. In FIG. 10, the waveform of the line 107 would be identical with the line 107 as transmitted and shown in FIG. 10A. The line 107′ being the line 107 delayed by one complete line period would repeat the wave shape of line 107. It should be noted that the diagonal XY thus intersects the one unit white level for the line 107 while intersecting at the two unit white level for the delayed line 107′. For the display of the picture information from camera C1, the even lines are eliminated as explained above. The next appearing line thus would be the line 109 followed by the delayed line 109′. The sequence of lines thus proceeds with each odd line followed by an identical delayed line delayed by one line period. In each instance, the diagonal XY would intersect the line of scan where there is a transition from black to white thereby minimizing the serrated effect which would otherwise be produced except for the delay and combining operation as provided at the transmitter of FIG. 9. The end result is that the picture as displayed on the display D reproduces the diagonal XY without excessive steps or serrations therein as compared to the case if the transmitter of FIG. 8 were not employed to compensate for the step change from black to white across a non-vertical edge.

I claim as my invention:

1. A method of receiving a plurality of n-separate video pictures in the form of a plurality of lines including the nth lines of each of said pictures commencing from a different preselected line at each of said plurality of pictures, comprising the steps of:

selecting the *n*th line from said plurality of lines commencing at a preselected line so that these lines are selected from one of said plurality of pictures;

delaying said selected lines for substantially n—1 line time periods;

combining said selected lines which are delayed with those which are undelayed; and displaying said selected and combined lines so that an undelayed line is followed by a corresponding delayed line.

2. In a system for receiving a plurality of n separate video pictures in the form of a plurality of lines including the nth line of said plurality of pictures commencing from a different preselected line in each of said plurality of pictures, the combination of:

means for selecting the nth line from said plurality of lines commencing at a preselected line so that the lines are selected from one of said plurality of pictures;

means for delaying said selected lines for substantially *n*—1 line time periods;

means for combining said selected lines which are undelayed with those which are delayed; and means for displaying said selected and combined lines so that an undelayed line is followed by a corresponding delayed line.

3. The combination of claim 2 includes:

means for gating the undelayed of said selected lines to said means for combining during its line period;

means for gating the delayed of said selected line to said means for combining.

4. In a system for transmitting and receiving a plurality of n video pictures the combination of:

means for selecting every nth line of said plurality of pictures commencing at a different preselected line for each of said plurality of pictures;

means for transmitting the selected lines in the order selected of each of said plurality of pictures in the form of a plurality of lines;

means for selecting the nth line from said plurality of lines commencing at a preselected line so that the lines are selected from one of said plurality of pictures;

means for delaying said selected lines for substantially *n*—1 line time periods;

means for combining said selected lines which are undelayed with those which are delayed; and means for displaying said selected and combined lines as said selected one of said plurality of pictures so that an undelayed line is followed by a delayed line.

5. The combination of claim 4 includes:

means for synchronizing the transmitting and receiving by periodically resetting to insure that the commencement of line selection occurs at the same line number.

6. A method of transmitting a plurality of *n* separate video pictures on a single channel comprising the steps of:

selecting every nth line of each of said picture commencing at a different preselected line for each of said plurality of pictures;

delaying each of said selected lines by substantially *n*—1 line periods;

combining the delayed selected lines with the undelayed selected lines; and transmitting the combined delayed and undelayed selected lines of each of said pictures.

7. In a system for transmitting and a plurality of *n*-separate video pictures, the combination of:

means for selecting every nth line of each of said plurality of pictures commencing at a different preselected line for each of said plurality of pictures;

means for delaying each of said selected lines for substantially *n*—1 line periods;

means for combining the delayed selective lines with the undelayed selected lines; and means for transmitting as a plurality of lines the combined delayed and undelayed selected lines of each of said pictures.

8. The combination of claim 7 includes:

means selecting the nth line from said plurality of lines commencing at a preselected line so that the lines are selected from one of said plurality of pictures;

means for delaying said selected lines for substantially $n-1$ time periods;

means for combining said selected lines which are undelayed with those which are delayed; and means for displaying said selected and combined lines as said selected one of said plurality of pictures so that an undelayed line is followed by a delayed line.

* * * * *